US011014777B2

(12) United States Patent
Tang

(10) Patent No.: US 11,014,777 B2
(45) Date of Patent: May 25, 2021

(54) CORD WINDING MODULE

(71) Applicant: Qingdao GoerTek Technology Co., Ltd., Qingdao (CN)

(72) Inventor: Mingjun Tang, Qingdao (CN)

(73) Assignee: QINGDAO GOERTEK TECHNOLOGY CO., LTD, Qingdao (CN)

( * ) Notice: Subject to any disclaimer, the term of this patent is extended or adjusted under 35 U.S.C. 154(b) by 313 days.

(21) Appl. No.: 16/072,500

(22) PCT Filed: Aug. 1, 2016

(86) PCT No.: PCT/CN2016/092695
§ 371 (c)(1),
(2) Date: Nov. 2, 2018

(87) PCT Pub. No.: WO2017/156958
PCT Pub. Date: Sep. 21, 2017

(65) Prior Publication Data
US 2019/0084791 A1 Mar. 21, 2019

(30) Foreign Application Priority Data
Mar. 16, 2016 (CN) .......................... 201610151003.4

(51) Int. Cl.
*B65H 75/48* (2006.01)
*H01R 13/72* (2006.01)
(Continued)

(52) U.S. Cl.
CPC ....... *B65H 75/486* (2013.01); *B65H 75/4431* (2013.01); *H01R 12/77* (2013.01);
(Continued)

(58) Field of Classification Search
CPC ........ H02G 11/00; H02G 11/02; B65H 75/00; B65H 75/02; B65H 75/04; B65H 75/18; B65H 75/486
See application file for complete search history.

(56) References Cited

U.S. PATENT DOCUMENTS 6,019,630 A 2/2000 Alpert
2004/0161950 A1 8/2004 Coleman
(Continued)

FOREIGN PATENT DOCUMENTS

CN 1339190 A 3/2002
CN 2594230 Y 12/2003
(Continued)

OTHER PUBLICATIONS

Notice of Reasons for Refusal dated in KR 10-2018-7021641 dated Apr. 10, 2019.
(Continued)

*Primary Examiner* — Robert J McCarry, Jr.
(74) *Attorney, Agent, or Firm* — Fox Rothschild LLP; Carol E. Thorstad-Forsyth

(57) ABSTRACT

A cord winding module, comprising a rotary wheel (9) on which a cord (11) is wound and a stop button (4) working cooperatively with the rotary wheel. The cord winding module further comprises a spring wire (5) working cooperatively with the stop button as an elastic support device, and the stop button automatically brakes the rotary wheel under the action of the elastic force of the spring wire and prevents the rotary wheel from retracting the cord. The spring wire has an arc shape, or exhibits an arc shape when pre-pressed and deformed by the stop button.

7 Claims, 5 Drawing Sheets

(51) Int. Cl.
*H02G 11/02* (2006.01)
*B65H 75/44* (2006.01)
*H01R 12/77* (2011.01)

(52) U.S. Cl.
CPC ............ *H01R 13/72* (2013.01); *H02G 11/02* (2013.01); *B65H 2701/3919* (2013.01)

(56) References Cited

U.S. PATENT DOCUMENTS

| | | | |
|---|---|---|---|
| 2010/0270413 A1* | 10/2010 | Chien | B65H 75/446 242/379.2 |
| 2013/0153701 A1 | 6/2013 | Huang et al. | |
| 2017/0033516 A1 | 2/2017 | Huang et al. | |

FOREIGN PATENT DOCUMENTS

| | | |
|---|---|---|
| CN | 1937332 A | 3/2007 |
| CN | 201121281 Y | 9/2008 |
| CN | 201327986 Y | 4/2009 |
| CN | 101582552 A | 5/2009 |
| CN | 201430677 Y | 5/2009 |
| CN | 201515115 U | 9/2009 |
| CN | 103130043 A | 6/2013 |
| CN | 205657280 U | 3/2016 |
| CN | 105680260 A | 6/2016 |
| EP | 2325124 A1 | 5/2011 |
| JP | 3151862 U | 7/2009 |

OTHER PUBLICATIONS

Supplementary European Search Report issued in EP 16894119 dated Jan. 7, 2019.

* cited by examiner

CORD WINDING MODULE

CROSS REFERENCE TO RELATED APPLICATIONS

This application is a U.S. National Stage entry under 35 U.S.C. § 371 based on International Application No. PCT/CN2016/092695, filed on Aug. 1, 2016, which was published under PCT Article 21(2) and which claims priority to Chinese Patent Application No. 201610151003.4, filed on Mar. 16, 2016. The disclosure of the priority applications are hereby incorporated herein in their entirety by reference.

TECHNICAL FIELD

The present disclosure relates to a cord winding module for receiving a cord or a signal wire of an electronic device.

BACKGROUND

Auxiliary devices having cords, such as earphones, mice, keyboards, etc., are used in many electronic devices. In order to use more conveniently, cord winding modules have been increasingly provided in these auxiliary devices for receiving cords or signal wires. The cord winding module typically comprises a rotary wheel, a coil spring and a stopper structure. The cord is wound on the rotary wheel, and can be automatically retracted under the elastic restoring force of the coil spring. In the retracting process, the stopper structure can prevent the rotary wheel from rotating and stop the retracting of the cord, so that a suitable length of the cord that has not been retracted can be reserved.

The stopper structure comprises a stop button and an elastic support device. The elastic support device can provide an elastic force to the stop button, and the stopper structure automatically brakes the rotary wheel under the action of the elastic force. If the stop button is pressed, the rotary wheel will be released, and the retraction of the cord will be started again.

The stopper structures of the cord winding modules on the market are elastically supported by a compression spring or a torsion spring structure. Such a structure occupies a lot of space, which limits the miniaturization of the products.

For example, a Chinese invention patent titled "Accommodation Device" (Application No.: 201110267313.X) discloses a stopper structure of a cord winding module, in which a spring 415 is an elastic support device of a locking device 400. As shown in FIG. 4 and FIG. 5, the spring 415 is a compression spring and has a certain height. Thus, a second chamber is specially provided on a mounting portion 230 to accommodate the spring 415, and it occupies a large space.

A Chinese invention patent titled "Accommodation Device" (Application No. 201110417406.6) discloses a stopper structure of a cord winding module, in which an elastic member 420 is an elastic support device of a lock assembly 400. As shown in FIG. 4 and FIG. 5, the elastic member 420 is a compression spring and has a certain height. Thus, a fixing groove 444 is specially provided on a fixing member 440 to accommodate the elastic member 420, and it occupies a large space.

A Chinese utility model patent "Headphone Cord Winding-up Device, Headphone Assembly and Mobile Terminal" (Application No. 200920108072.2) discloses a stopper structure of a cord winding module, in which a hook spring 13 is an elastic support device of a hook plate 12. As shown in FIG. 1, the hook spring 13 is a torsion spring and has a certain height. Thus, a fixing slot is provided at the side of a base 8 to install the hook spring 13, and it also occupies a large space.

SUMMARY

In view of the above problems, the present disclosure provides a cord winding module, comprising a stopper structure in which a spring wire works cooperatively with a stop button, thereby reducing the size of the cord winding module.

The technical solutions of the present disclosure are as follows.

A cord winding module, comprising a rotary wheel on which a cord is wound and a stop button working cooperatively with the rotary wheel, wherein the cord winding module further comprises a spring wire working cooperatively with the stop button as an elastic support device, and the stop button automatically brakes the rotary wheel under the action of the elastic force of the spring wire and prevents the rotary wheel from retracting the cord; and the spring wire has an arc shape, or exhibits an arc shape when pre-pressed and deformed by the stop button.

In some embodiments, the cord winding module further comprises a fixing cover, wherein the rotary wheel is installed under the fixing cover, and the stop button is installed at a side of the fixing cover;

a receiving groove is formed on the body of the fixing cover, and the spring wire is installed in the receiving groove to push the stop button, to drive the stop button to brake the rotary wheel; and the receiving groove has an arc shape, and both ends of the spring wire are bent to form an engaging portion.

In some embodiments, the stop button is a lever structure, a mounting hole is arranged in the middle of the stop button, the mounting hole is engaged with a pin to mount the stop button at a side of the fixing cover, and the stop button rotates around the pin; and a ratchet pawl is provided at the end of the stop button which cooperates with the rotary wheel, and the ratchet pawl has a plastic sleeve.

In some embodiments, a ratchet to cooperate with the stop button is mounted on an upper end of the rotary wheel, a shaft hole is arranged in the middle of the rotary wheel, and a rotating shaft is fixed on the fixing cover; and the rotary wheel rotates around the rotating shaft, a snap ring is arranged at a lower end of the rotating shaft, and the rotary wheel is limited on the rotating shaft by the snap ring.

In some embodiments, a mounting slot is provided at the upper end of the rotary wheel;

a circuit connection elastic piece is disposed in the mounting slot;

an FPC connection terminal is provided on the lower surface of the fixing cover;

one end of the circuit connection elastic piece is connected to the cord, and the other end is connected to the FPC connection terminal; and the circuit connection elastic piece is driven by the rotary wheel to rotate with respect to the FPC connection terminal.

In some embodiments, the FPC connection terminal has a ring shape and is connected with an external flexible printed circuit board;

the number of the circuit connection elastic piece is two, and the two circuit connection elastic piece are symmetrically arranged and in contact with the FPC connection terminal; and the rotary wheel applies a preload to the FPC connection terminal through the circuit connection elastic pieces.

In some embodiments, the end of the circuit connection elastic piece which is in contact with the FPC connection terminal has a fork structure with an arc segment, and the circuit connection elastic piece is connected to the FPC connection terminal through the arc segment.

In some embodiments, an energy storage chamber is provided at the lower end of the rotary wheel;

a coil spring is installed in the energy storage chamber, one end of the coil spring is fixed on the rotating shaft, and the other end is fixed on the sidewall of the energy storage chamber; and when the cord is pulled out, the rotary wheel rotates to tighten the coil spring to store energy and provide power for retracting the cord afterwards.

In some embodiments, a rotary wheel cover is installed on the energy storage chamber;

a seal ring is provided in the rotary wheel cover;

the shaft hole is also provided with a seal ring;

a damping grease is provided in the energy storage chamber; and the seal rings prevent leakage of the damping grease.

In some embodiments, a clamping hole is provided at a sidewall of the rotary wheel cover;

a clamping claw is provided on the sidewall of the energy storage chamber;

the energy storage chamber is clamped fitted with the rotary wheel cover; and the sidewall of the rotary wheel cover is provided with cracks at both sides of the clamping hole, to allow the sidewall to expand outwardly and deform at these positions to fit the clamping claw.

The advantageous effects of the present disclosure are as follows.

The cord winding module of the present disclosure adopts a stopper structure in which a spring wire works cooperatively with a stop button, so the space to be occupied is reduced and the cord winding module is smaller.

The damping grease is provided in the energy storage chamber in which the coil spring is disposed. The damping grease can adjust the unwinding speed of the coil spring so that the cord is slowly retracted to avoid damage to the cord.

The connection between the cord and the external circuit is realized through the contact type FPC connection terminal and the circuit connection elastic piece, both of which are always elastically contact without being influenced by the rotation of the rotary wheel, and do not affect the circuit signal at all.

Figure 1:
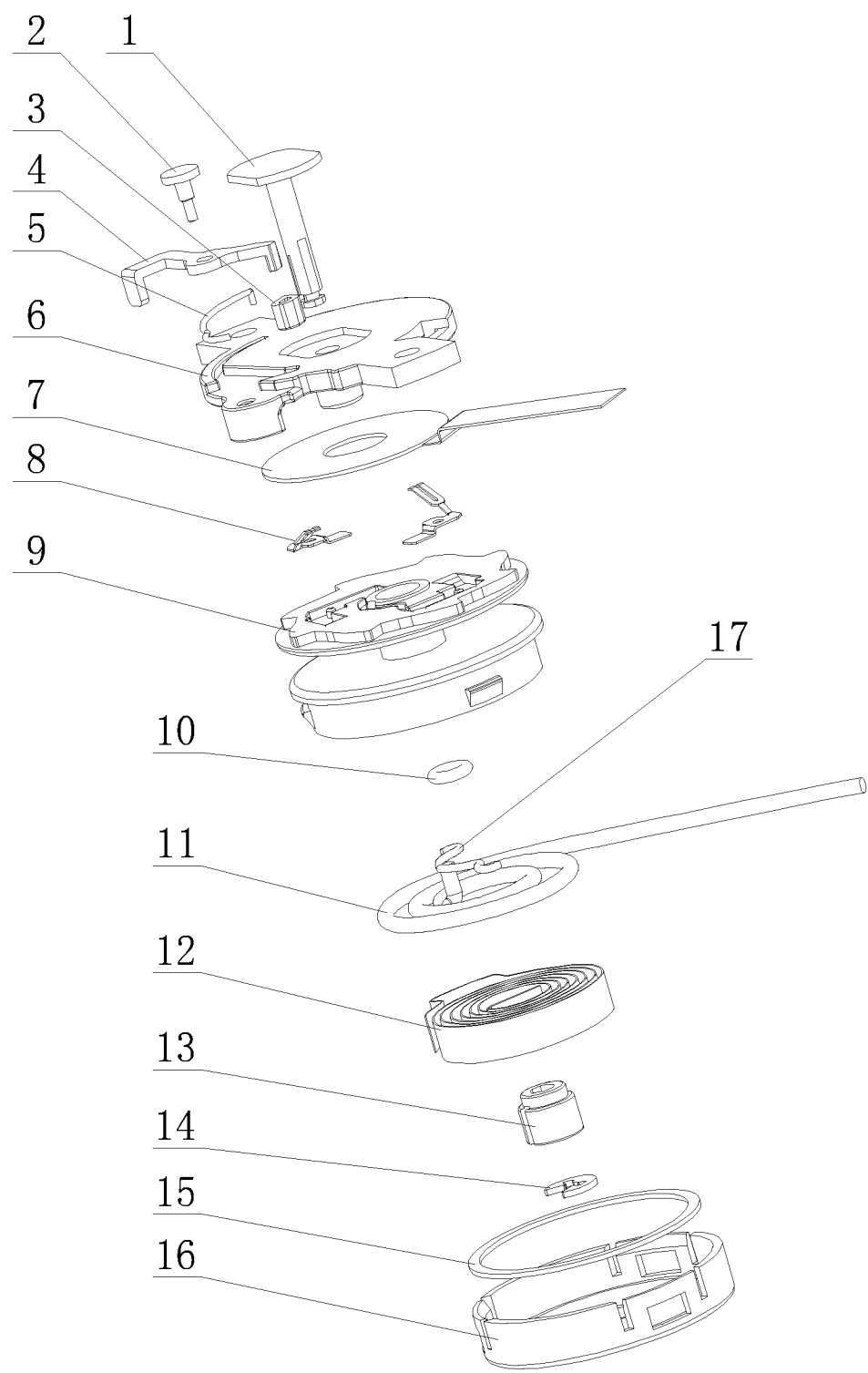
FIG. 1 is an exploded view of the present disclosure.

In the drawings: 1: rotating shaft; 2: pin; 3: plastic sleeve; 4: stop button; 5: spring wire; 6: fixing cover; 7: FPC connection terminal; 8: circuit connection elastic piece; 8-1: upper connection terminal; 8-2: lower connection terminal; 8-3: fixing hole; 9: rotary wheel; 9-1: ratchet; 9-2: mounting slot; 9-3: cord spool; 9-4: energy storage chamber; 9-5: clamping claw; 10: seal ring; 11: cord; 12: coil spring; 13: rotating shaft sleeve; 14: snap ring; 15: seal ring; 16: rotary wheel cover; and 17: cord.

DETAILED DESCRIPTION

In order to make the objectives, technical solutions and advantages of the present disclosure clearer, the present disclosure is further described in detail with reference to the accompanying drawings and the embodiments.

First Embodiment

Figure 2:
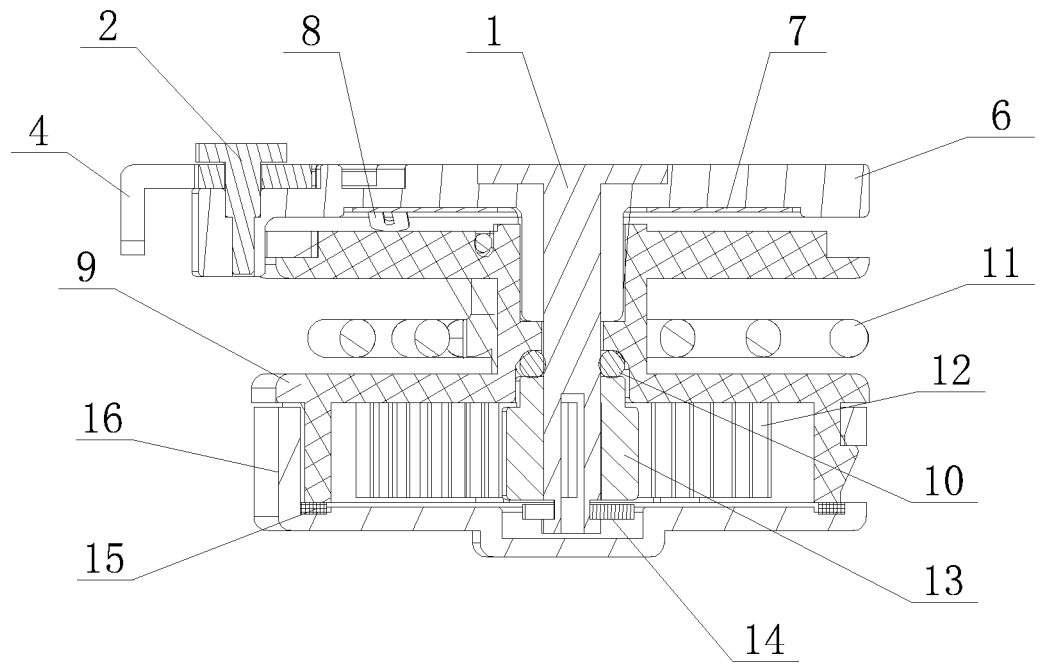
FIG. 2 is a sectional view of the present disclosure.

FIG. 1 and FIG. 2 show an embodiment of the present disclosure. In the present embodiment, a cord winding module comprises a rotary wheel 9 on which a cord 11 or a signal wire is wound and a stop button 4 working cooperatively with the rotary wheel 9. The cord winding module further comprises a spring wire 5 working cooperatively with the stop button 4 as an elastic support device. The stop button 4 automatically brakes the rotary wheel 9 under the action of the elastic force of the spring wire 5 to prevent the rotary wheel 9 from rotating. The spring wire 5 has an arc shape, or exhibits an arc shape when pre-pressed and deformed by the stop button 4.

The stop button 4 automatically stops the rotating of the rotary wheel 9 for retracting the cord 11, but it cannot stop the rotating of the rotary wheel 9 for unwinding the cord 11. That is a structural requirement on the engagement between a ratchet 9-1 and a ratchet pawl. The stop button 4 may employ a metal bottom.

Figure 3:
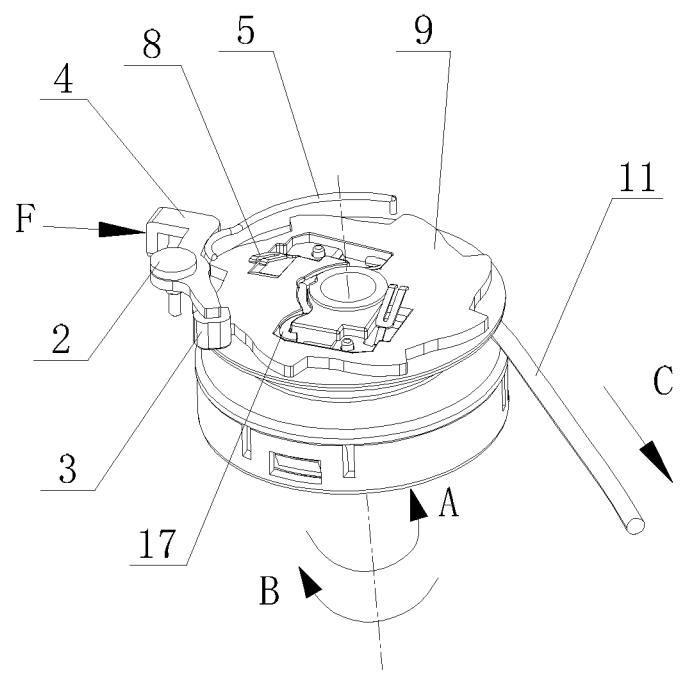
FIG. 3 is an assembly view of the present disclosure in which a fixing cover is not included.
Figure 4:
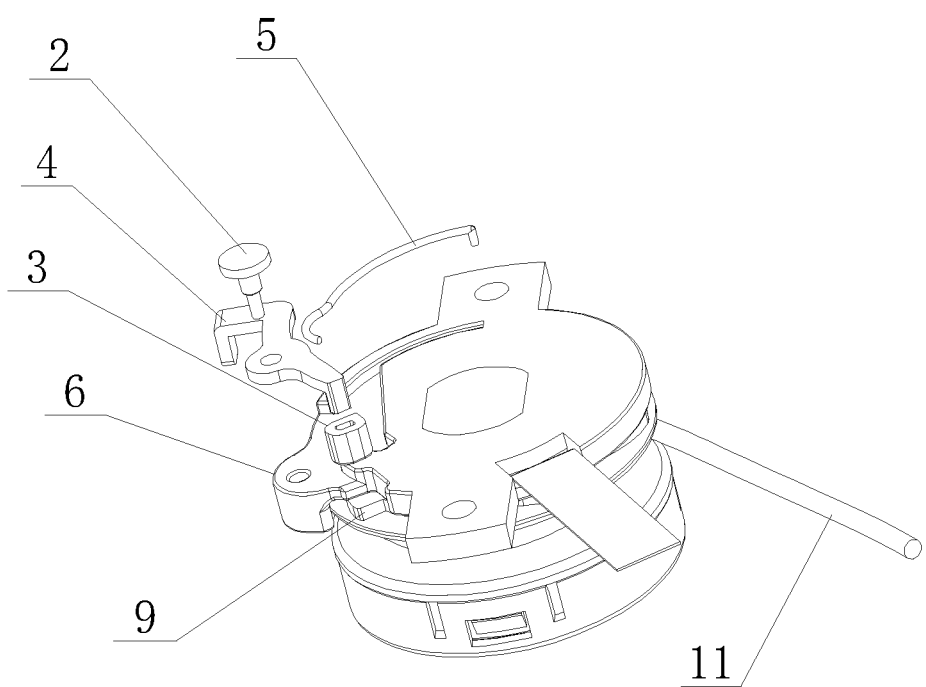
FIG. 4 is an assembly view of the present disclosure in which a fixing cover has been installed but a spring wire has not been installed.

As shown in FIG. 3 and FIG. 4, the spring wire 5 is a single spring wire. According to the requirement of elastic force, the single spring wire may be folded into two side-by-side spring wires, and such a design can increase the spring force and prolong the use time. The arc shape of the spring wire 5 may also be called an arch shape. The spring wire 5 may exhibit an arc shape without a preload, or exhibit an arc shape when pre-pressed and deformed. It must be ensured that the spring wire 5 provides sufficient elastic support to the stop button 4 after they are installed.

As shown in FIG. 2 and FIG. 4, the cord winding module further comprises a fixing cover 6. The rotary wheel 9 is installed under the fixing cover 6, and the stop button 4 is installed at a side of the fixing cover 6. A receiving groove is formed on the body of the fixing cover 6. The spring wire 5 is installed in the receiving groove to push the stop button 4, and the stop button 4 is driven to brake the rotary wheel 9. The receiving groove has an arc shape, and both ends of the spring wire 5 are bent to form an engaging portion.

The both ends of the spring wire 5 may not be bent, but it will be easier to cooperate with other parts after bending.

Figure 5:
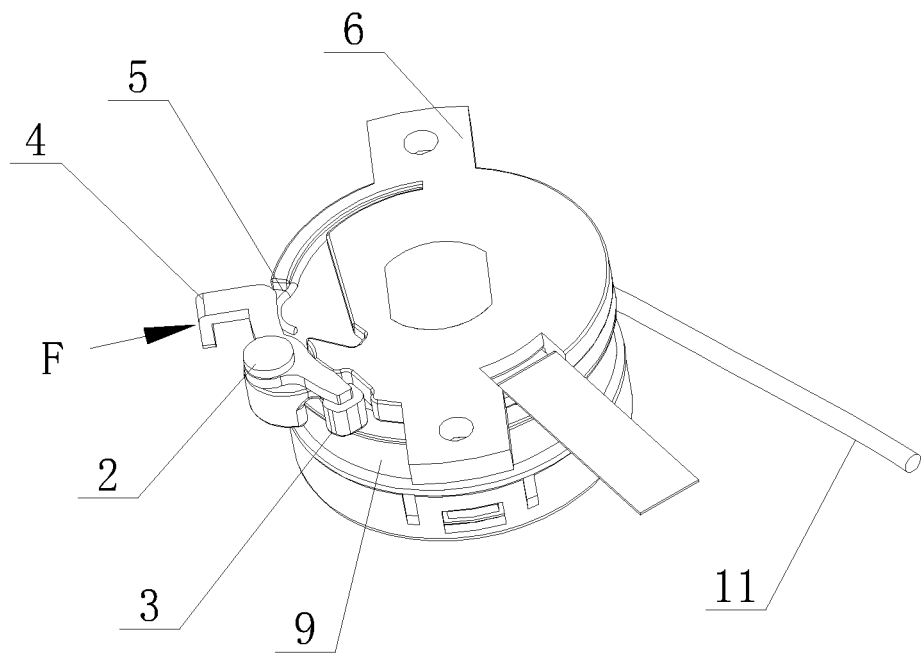
FIG. 5 is an assembly view of the present disclosure in which a spring wire has been installed.

As shown in FIG. 4 and FIG. 5, the spring wire 5 is substantially horizontally installed in the receiving groove; that is, the radial direction of the arc shape is parallel to the plane of the fixing cover 6, so that the height can be effectively reduced and the occupied space is small.

The stop button 4 is a lever structure, a mounting hole is arranged in the middle of the stop button, and the mounting hole is engaged with a pin 2 to fix the stop button at a side of the fixing cover. The stop button 4 rotates around the pin 2. A ratchet pawl is provided at the end of the stop button 4 which cooperates with the rotary wheel 9. The ratchet pawl has a plastic sleeve 3. When the rotary wheel 9 rotates to unwind the cord 11, the plastic sleeve 3 acts as a lubricant between the ratchet pawl and the rotary wheel 9.

A ratchet 9-1 to cooperate with the stop button 4 is mounted on the upper end of the rotary wheel 9, a shaft hole is arranged in the middle of the rotary wheel 9, and a rotating shaft 1 is fixed on the fixing cover 6. The rotary wheel 9 rotates around the rotating shaft 1. A snap ring 14 is arranged at the lower end of the rotating shaft 1, and the rotary wheel 9 is limited on the rotating shaft 1 by the snap ring 14.

Figure 6:
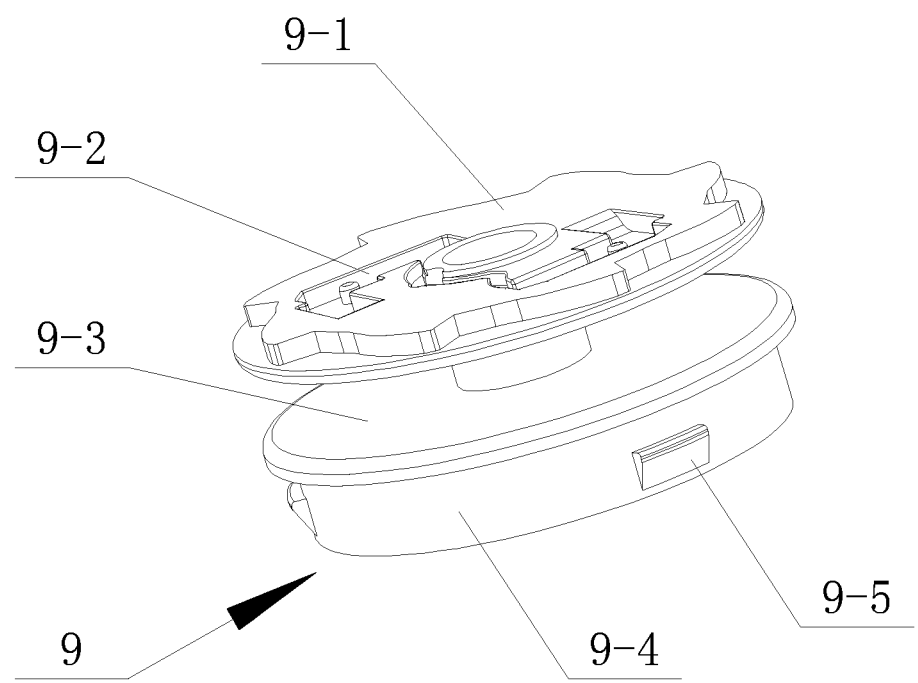
FIG. 6 is a perspective view of a rotary wheel of the present disclosure.

As shown in FIG. 2, FIG. 3 and FIG. 6, a mounting slot 9-2 is provided at the upper end of the rotary wheel 9. A circuit connection elastic piece 8 is disposed in the mounting slot 9-2. An FPC connection terminal 7 is provided on the lower surface of the fixing cover 6. One end of the circuit connection elastic piece 8 is connected to the cord 11, and the other end is connected to the FPC connection terminal 7. The circuit connection elastic piece 8 is driven by the rotary wheel 9 to rotate with respect to the FPC connection terminal 7.

The FPC connection terminal 7 has a ring shape and is connected with an external flexible printed circuit board (i.e. FPC). The circuit connection elastic piece 8 is two circuit connection elastic pieces 8, and they are symmetrically arranged and in contact with the FPC connection terminal 7. The rotary wheel 9 applies a preload to the FPC connection terminal 7 through the circuit connection elastic pieces 8, so that the reliability of the circuit connection can be fully guaranteed. Both the FPC connection terminal 7 and the circuit connection elastic pieces 8 are made of a material with good electrical conductivity, such as copper alloy.

A cord 17 is connected between the two circuit connection elastic pieces 8 (connected with the lower connection terminal 8-2 in FIG. 7), and the cord 17 is connected to the cord 11.

Figure 7:
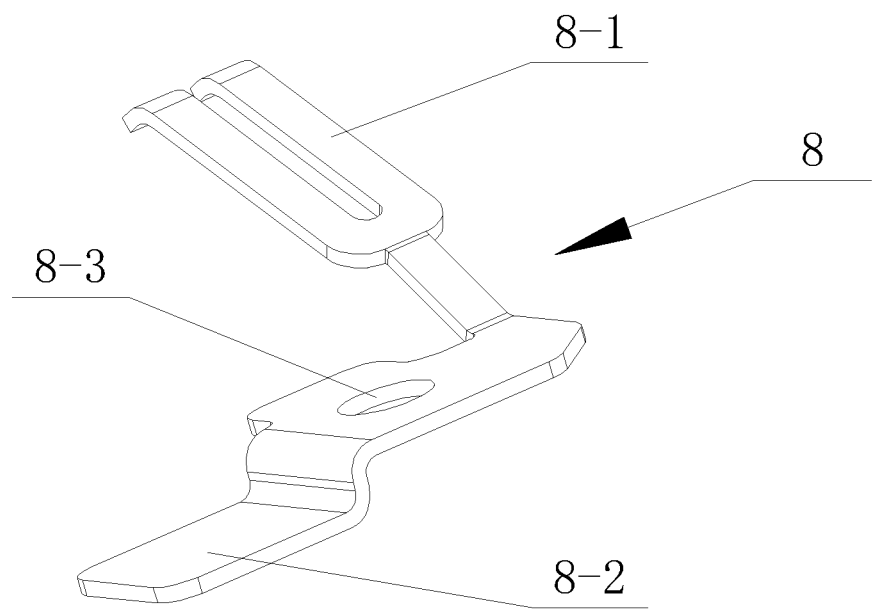
FIG. 7 is a perspective view of a circuit connection elastic piece of the present disclosure.

As shown in FIG. 7, the end of the circuit connection elastic piece 8 which contacts the FPC connection terminal 7 has a fork structure (upper connection terminal 8-1 in FIG. 7) with an arc segment. The circuit connection elastic piece 8 is connected to the FPC connection terminal 7 through the arc segment, thereby reducing the friction in sliding.

A fixing hole 8-3 is arranged in the middle of the circuit connection elastic piece 8. Correspondingly, a pin is arranged in the mounting slot 9-2 to cooperate with the fixing hole 8-3. With this design, the circuit connection elastic piece 8 can more stably rotate with respect to the FPC connection terminal 7.

An energy storage chamber 9-4 is provided at the lower end of the rotary wheel 9. A coil spring 12 is installed in the energy storage chamber 9-4. One end of the coil spring 12 is fixed on the rotating shaft 1, and the other end is fixed on the sidewall of the energy storage chamber. When the cord 11 is pulled out, the rotary wheel 9 rotates, and the coil spring 12 is tightened to store energy and provides power for retracting the cord 11 afterwards.

A rotary wheel cover 16 is installed on the energy storage chamber 9-4.

A clamping hole is provided at a sidewall of the rotary wheel cover 16; a clamping claw 9-5 is provided on the sidewall of the energy storage chamber 9-4. The energy storage chamber 9-4 is clamped fitted to the rotary wheel cover 16. The sidewall of the rotary wheel cover 16 is provided with cracks at both sides of the clamping hole, to allow the sidewall to expand outwardly and deform at these positions to fit the clamping claw 9-5.

When the cord winding module is used, the lower end of the spring wire 5 is in contact with the upper end of the stop button 4 and maintains a certain amount of preload of the spring wire 5, so the stop button 4 is always subjected to a pushing force from the spring wire 5 in the opposite direction to the pressing force F, so that the plastic sleeve 3 keeps the trend of inserting into the ratchet teeth at the end of the rotary wheel 9.

The angle between the ratchet teeth of the end face of the rotary wheel 9 and the tangent of the outer contour is an acute angle on the left side and a right angle on the right side. In a normal state, the rotary wheel 9 can rotate clockwise in the direction of the arrow B, and cannot rotate anticlockwise in the direction of the arrow A due to the braking of the plastic sleeve 3.

When the cord 11 is pulled in the direction of the arrow C in FIG. 4, the rotary wheel 9 rotates clockwise in the direction of the arrow B, and the coil spring 12 is wound in the opposite direction so that the rotary wheel 9 is inclined to rotate anticlockwise in the direction of the arrow A. When the cord 11 is not pulled any longer, due to the action of the stopper structure, the plastic sleeve 3 inserts into the ratchet teeth of the end face of the rotary wheel 9 to prevent the rotary wheel 9 from rotating anticlockwise in the direction of the arrow A. When a force F is applied on the end of the stop button 4, the plastic sleeve 3 moves outwardly and disengages from the ratchet teeth of the end face of the rotary wheel 9, the rotary wheel 9 rotates anticlockwise in the direction of the arrow A due to the action of the coil spring 12, and the cord 11 is retracted into the cord spool 9-3 of the rotary wheel.

Second Embodiment

The present embodiment makes a further improvement on the energy storage chamber 9-4 on the basis of the first embodiment. As shown in FIG. 1 and FIG. 2, a rotary wheel cover 16 is installed on an energy storage chamber 9-4, a seal ring 15 is provided in the rotary wheel cover 16, and a seal ring 10 is provided in the shaft hole. A damping grease is provided in the energy storage chamber 9-4. The seal rings 10, 15 prevent leakage of the damping grease.

In some embodiments, a rotating shaft sleeve 13 is provided in the energy storage chamber 9-4, the position of the rotating shaft sleeve 13 is limited by the snap ring 14, and the upper end of the rotating shaft sleeve 13 tightly presses the seal ring 10, so that the sealing effect can be improved. The seal ring 15 is tightly pressed by the energy storage chamber 9-4.

The damping grease can adjust the unwinding speed of the coil spring so that the cord 11 is slowly retracted to avoid damage to the cord 11.

Third Embodiment

The present embodiment makes a further improvement on the circuit connection elastic piece on the basis of the first embodiment. In the present embodiment, the number of the circuit connection elastic piece is one (not shown), and actually it is obtained by integrally forming the two circuit connection elastic pieces 8 in the first embodiment into one piece. The other structures such as the fork structure are the same except that they are integrally punched and are connected to the cord 11 in the middle of it. This design can simplify the assembling process of the circuit connection portion.

The above description is merely preferable embodiments of the present disclosure. Based on the above teachings of the present disclosure, those skilled in the art may make other improvements or modifications on the basis of the foregoing embodiments. It should be understood by those skilled in the art that the above specific description is only for better explaining the present disclosure, and the protection scope of the present disclosure should be determined by the protection scope of the claims.

What is claimed is:

1. A cord winding module, comprising a fixing cover, a rotary wheel on which a cord is wound and a stop button working cooperatively with the rotary wheel, wherein the cord winding module further comprises a spring wire working cooperatively with the stop button as an elastic support device, and the stop button automatically brakes the rotary wheel under the action of the elastic force of the spring wire and prevents the rotary wheel from retracting the cord; and
the spring wire has an arc shape, or exhibits an arc shape when pre-pressed and deformed by the stop button;
wherein the rotary wheel is installed under the fixing cover, and the stop button is installed at a side of the fixing cover; a receiving groove is formed on the body of the fixing cover, and the spring wire is substantially horizontally installed in the receiving groove to push the stop button, to drive the stop button to brake the rotary wheel; and the receiving groove has an arc shape, and both ends of the spring wire are bent to form an engaging portion;
wherein a mounting slot is provided at the upper end of the rotary wheel; a circuit connection elastic piece is disposed in the mounting slot; an flexible printed circuit (FPC) connection terminal is provided on the lower surface of the fixing cover; one end of the circuit connection elastic piece is connected to the cord, and the other end is connected to the flexible printed circuit (FPC) connection terminal; and the circuit connection elastic piece is driven by the rotary wheel to rotate with respect to the flexible printed circuit (FPC) connection terminal;
wherein the end of the circuit connection elastic piece which is in contact with the flexible printed circuit (FPC) connection terminal has a fork structure with an arc segment, and the circuit connection elastic piece is connected to the flexible printed circuit (FPC) connection terminal through the arc segment.

2. The cord winding module according to claim 1, wherein the stop button is a lever structure, a mounting hole is arranged in the middle of the stop button, the mounting hole is engaged with a pin to mount the stop button at a side of the fixing cover, and the stop button rotates around the pin; and
a ratchet pawl is provided at the end of the stop button which cooperates with the rotary wheel, and the ratchet pawl has a plastic sleeve.

3. The cord winding module according to claim 1, wherein a ratchet to cooperate with the stop button is mounted on an upper end of the rotary wheel, a shaft hole is arranged in the middle of the rotary wheel, and a rotating shaft is fixed on the fixing cover; and
the rotary wheel rotates around the rotating shaft, a snap ring is arranged at a lower end of the rotating shaft, and the rotary wheel is limited on the rotating shaft by the snap ring.

4. The cord winding module according to claim 3, wherein an energy storage chamber is provided at the lower end of the rotary wheel;
a coil spring is installed in the energy storage chamber, one end of the coil spring is fixed on the rotating shaft, and the other end is fixed on the sidewall of the energy storage chamber; and
when the cord is pulled out, the rotary wheel rotates to tighten the coil spring to store energy and provide power for retracting the cord afterwards.

5. The cord winding module according to claim 4, wherein a rotary wheel cover is installed on the energy storage chamber;
a seal ring is provided in the rotary wheel cover;
the shaft hole is also provided with a seal ring;
a damping grease is provided in the energy storage chamber; and
the seal rings prevent leakage of the damping grease.

6. The cord winding module according to claim 5, wherein a clamping hole is provided at a sidewall of the rotary wheel cover;
a clamping claw is provided on the sidewall of the energy storage chamber;
the energy storage chamber is clamped fitted with the rotary wheel cover; and
the sidewall of the rotary wheel cover is provided with cracks at both sides of the clamping hole, to allow the sidewall to expand outwardly and deform at these positions to fit the clamping claw.

7. The cord winding module according to claim 5, wherein the FPC connection terminal has a ring shape and is connected with an external flexible printed circuit board;
the number of the circuit connection elastic piece is two, and the two circuit connection elastic piece are symmetrically arranged and in contact with the FPC connection terminal; and
the rotary wheel applies a preload to the FPC connection terminal through the circuit connection elastic pieces.

* * * * *